US011113957B2

(12) United States Patent
Ova et al.

(10) Patent No.: US 11,113,957 B2
(45) Date of Patent: Sep. 7, 2021

(54) SYSTEM AND METHOD FOR PROVIDING REAL-TIME AND PREDICTIVE SPEED, TRAFFIC SIGNAL TIMING, STATION DWELL TIME, AND DEPARTURE WINDOW INFORMATION TO TRANSIT VEHICLE

(71) Applicant: TRAFFIC TECHNOLOGY SERVICES, INC., Beaverton, OR (US)

(72) Inventors: Kiel Roger Ova, Roberts, MT (US); Venkata Subbarao Nallamothu, Elkridge, MD (US); Keith Andrew Riniker, Annapolis, MD (US); Thomas Bauer, Beaverton, OR (US); Jingtao Ma, Portland, OR (US)

(73) Assignee: TRAFFIC TECHNOLOGY SERVICES, INC., Beaverton, OR (US)

( * ) Notice: Subject to any disclaimer, the term of this patent is extended or adjusted under 35 U.S.C. 154(b) by 289 days.

(21) Appl. No.: 15/943,212

(22) Filed: Apr. 2, 2018

(65) Prior Publication Data

US 2018/0286223 A1    Oct. 4, 2018

Related U.S. Application Data

(60) Provisional application No. 62/479,691, filed on Mar. 31, 2017.

(51) Int. Cl.
     *G08G 1/01*      (2006.01)
     *G08G 1/0967*    (2006.01)
     (Continued)

(52) U.S. Cl.
     CPC ......... *G08G 1/0129* (2013.01); *G08G 1/0112* (2013.01); *G08G 1/0145* (2013.01);
     (Continued)

(58) Field of Classification Search
     CPC combination set(s) only.
     See application file for complete search history.

(56) References Cited

U.S. PATENT DOCUMENTS

| | | | | |
|---|---|---|---|---|
| 3,509,525 A | * | 4/1970 | Levine | ............. G08G 1/096716 340/932 |
| 2014/0361125 A1 | * | 12/2014 | Fries | ...................... B61L 29/04 246/473.1 |

(Continued)

FOREIGN PATENT DOCUMENTS

WO    WO-2014201895 A1 * 12/2014      ........... G08G 1/0129

OTHER PUBLICATIONS

Final Report, "Investigating the Potential Benefits of Broadcasted Signal Phase and Timing (sPaT) Data under IntelliDRive", California PATH Program, Institute of Transportation Studies, University of California, Berkeley, May 20, 2011 (98 pages).

(Continued)

*Primary Examiner* — Redhwan K Mawari
(74) *Attorney, Agent, or Firm* — FisherBroyles LLP; Micah D. Stolowitz

(57) ABSTRACT

Devices, systems, and methods are disclosed for connecting traffic signal control infrastructure, in-service transit vehicles, and back-end computing and service systems, and providing an adaptable user interface, remotely effecting a change on a Portable Electronic Device (PED), verifying location of transit vehicles and tailoring information to the behavior of a transit operator. System determines an "optimal window" for a transit vehicle to travel through a maximum number of consecutive traffic signals during the green vehicular phase. The system determines and sends a recommended speed to traverse the optimal window. In a case where an optimal window is not possible under current circumstances, the system determines and then advises the (Continued)

driver to remain at the current station for a specified dwell time.

7 Claims, 12 Drawing Sheets

(51) Int. Cl.
    *G08G 1/0968*     (2006.01)
    *G01C 21/20*     (2006.01)
    *G01C 21/36*     (2006.01)

(52) U.S. Cl.
    CPC . *G08G 1/096716* (2013.01); *G08G 1/096741* (2013.01); *G08G 1/096775* (2013.01); *G08G 1/096805* (2013.01); *G01C 21/20* (2013.01); *G01C 21/3655* (2013.01)

(56) References Cited

U.S. PATENT DOCUMENTS

| | | | |
|---|---|---|---|
| 2015/0227890 A1* | 8/2015 | Bednarek | G06Q 10/08355 705/26.81 |
| 2018/0082582 A1* | 3/2018 | Baller | G08G 1/087 |
| 2018/0286223 A1* | 10/2018 | Ova | G08G 1/0129 |
| 2018/0293884 A1* | 10/2018 | Liu | G08G 1/012 |
| 2019/0283862 A1* | 9/2019 | Hu | B64D 31/00 |

OTHER PUBLICATIONS

SAE J2735 DSRC Message Dictionary Overview, Mar. 8, 2012 (10 pages).
National Academies of Sciences, Engineering, and Medicine. 2013. Transit Capacity and Quality of Service Manual, Third Edition. Washington, DC: The National Academies Press. https://doi.org/10.17226/24766. (805 pages submitted in 5 parts).

\* cited by examiner

SYSTEM AND METHOD FOR PROVIDING REAL-TIME AND PREDICTIVE SPEED, TRAFFIC SIGNAL TIMING, STATION DWELL TIME, AND DEPARTURE WINDOW INFORMATION TO TRANSIT VEHICLE

CROSS-REFERENCE TO RELATED APPLICATIONS

This application is a non-provisional of provisional application No. 62/479,691 filed Mar. 31, 2017. The provisional application is incorporated herein by this reference in its entirety. Applicant claims priority under the Paris Convention based on the provisional application.

COPYRIGHT NOTICE

©2016 Sabra, Wang & Associates, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR§ 1.71(d).

BACKGROUND

Nearly half of the total passenger miles traveling on public transportation systems are on at-grade modes that travel through signalized intersections. Consequently, the travel time and reliability of these modes is significantly impacted by traffic signal system operations along the transit routes. Several studies of transit systems indicate that up to 40% of the delay experienced by an at-grade transit vehicle can be traced to delays at a traffic signal. Stops at traffic signals delay transit vehicles and lead to longer travel times; degrade the quality of transit service as they are a source of discomfort and have a higher travel time perception by transit users; and contribute to higher energy consumption due to more acceleration and deceleration maneuvers. Fewer stops and a slower transit vehicle speed are perceived by transit passengers as an improvement in the quality of the trip compared to a higher maximum speed with more frequent stops.

To mitigate transit vehicle delays and stops at traffic signals, transportation agencies have traditionally implemented a combination of engineering and policy measures focused on manipulating the environment outside of the transit vehicle, such as signal timing (transit signal priority, preemption), and/or the roadway network changes (queue jumps, transit-only lanes, yield-to-transit vehicle laws). The need remains for improvements to reduce delay, improve safety, mobility, economic competitiveness and environmental sustainability of transit vehicles. These and other challenges are addressed in the present disclosure.

SUMMARY

In some aspects, the present disclosure segues from the traditional approach of adapting the environment outside of the transit vehicle into adapting a transit operator's behavior to the environment. In some embodiments, solutions are disclosed that may provide transit vehicle operators with augmented reality that connects roads, transit ways, traffic signals, humans (transit vehicle operators) and vehicles to improve the mobility, safety, economic competitiveness and environmental sustainability of transit vehicles. In some embodiments, disclosed solutions may manipulate a transit operator's behaviors and longitudinal vehicle control operations of the transit vehicle to coordinate transit vehicle operations with signal systems, thereby optimizing the performance of transit operations. Such solutions build on integrating existing technology, including real-time and predictive speed, traffic signal timing information, with new devices, methods, and systems to provide station dwell time, and departure window information to transit vehicles in a timely manner.

The present disclosure, in some embodiments, provides methods and systems related to correlating in the real-time (second-by-second, or more frequent data resolution) a transit vehicle's location, roadway and transit way geometric data, traffic signal timing and detector data to communicate longitudinal vehicle control recommendations, including: speed, acceleration, deceleration, stop location, stop duration, and departure time; and situational awareness information, including: predicted time to the start of the traffic signal yellow interval, red interval, and green interval; to the transit vehicle operator and/or to an autonomous vehicle longitudinal control system. Not all of these features may be implemented in some systems. The longitudinal vehicle control recommendations and situational awareness information may be communicated to the in-vehicle display device or to a Mobile Data Terminal (MDT).

The present disclosure, in some embodiments, provides a system and method to predict whether a transit vehicle can reach a next signal while it is in a green traffic signal state, and deliver advisory messages related to optimal driving speeds to a transit vehicle operator to enable driving through the maximum number of signals between the transit vehicle and the next station during a traffic signal system's green band through the in-vehicle display device or a Mobile Data Terminal (MDT).

In other aspects, the present disclosure teaches a system and method to retrieve a transit vehicle's location, determine whether the transit vehicle is at a traffic signal stop line, and the traffic signal display to the transit vehicle is red, and compute and deliver the remaining time of the red interval to the transit vehicle operator through an in-vehicle display device or a Mobile Data Terminal (MDT) on a second-by-second, or more frequent basis.

In other aspects, the present disclosure may provide a system and method to retrieve a transit vehicle's location, determine whether the transit vehicle is at a transit station or stop, and compute and deliver an indication of the additional time that the transit vehicle should wait before leaving the station in order to proceed through the maximum number of signals in green between the current station and the next station. The indication may be part of a message delivered to the transit vehicle operator through an in-vehicle display device or a Mobile Data Terminal (MDT) on a second-by-second, or more frequent basis.

The present invention may provide a system and method to retrieve a transit vehicle's location, determine whether the transit vehicle is at a transit station or stop, and compute and deliver the latest time that the transit vehicle may depart the station and still proceed through the next signal (or signals) during a green interval to the transit vehicle operator through the in-vehicle display device or a Mobile Data Terminal (MDT) on a second-by-second, or more frequent basis.

BRIEF DESCRIPTION OF THE DRAWINGS

The invention will now be described in more detail, by way of example only, with reference to the accompanying drawings, in which like numbers refer to like elements wherein.

DETAILED DESCRIPTION AND BEST MODE OF IMPLEMENTATION

The terminology used herein is for the purpose of describing particular embodiments only, and is not intended to be limiting of the invention. As used herein, the singular forms "a", "an", and "the" are intended to include the plural forms as well as the singular forms, unless the context clearly indicates otherwise. It is further understood that the terms "comprises", and/or "comprising" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Specific acronyms used herein are defined in the glossary (See Variable Dictionary) below.

In describing the invention, it is understood that a number of techniques and steps are disclosed. Each of these has individual benefit, and each can also be used in conjunction or combination with one or more, or in some cases all, of the other disclosed techniques. Accordingly, for the sake of clarity, this description will refrain from repeating every possible combination of individual steps in an unnecessary fashion. Nevertheless, the specification and claims should be read with the understanding that such combinations are entirely within the scope of the invention and claims.

In the following discussion, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

Figure 1:
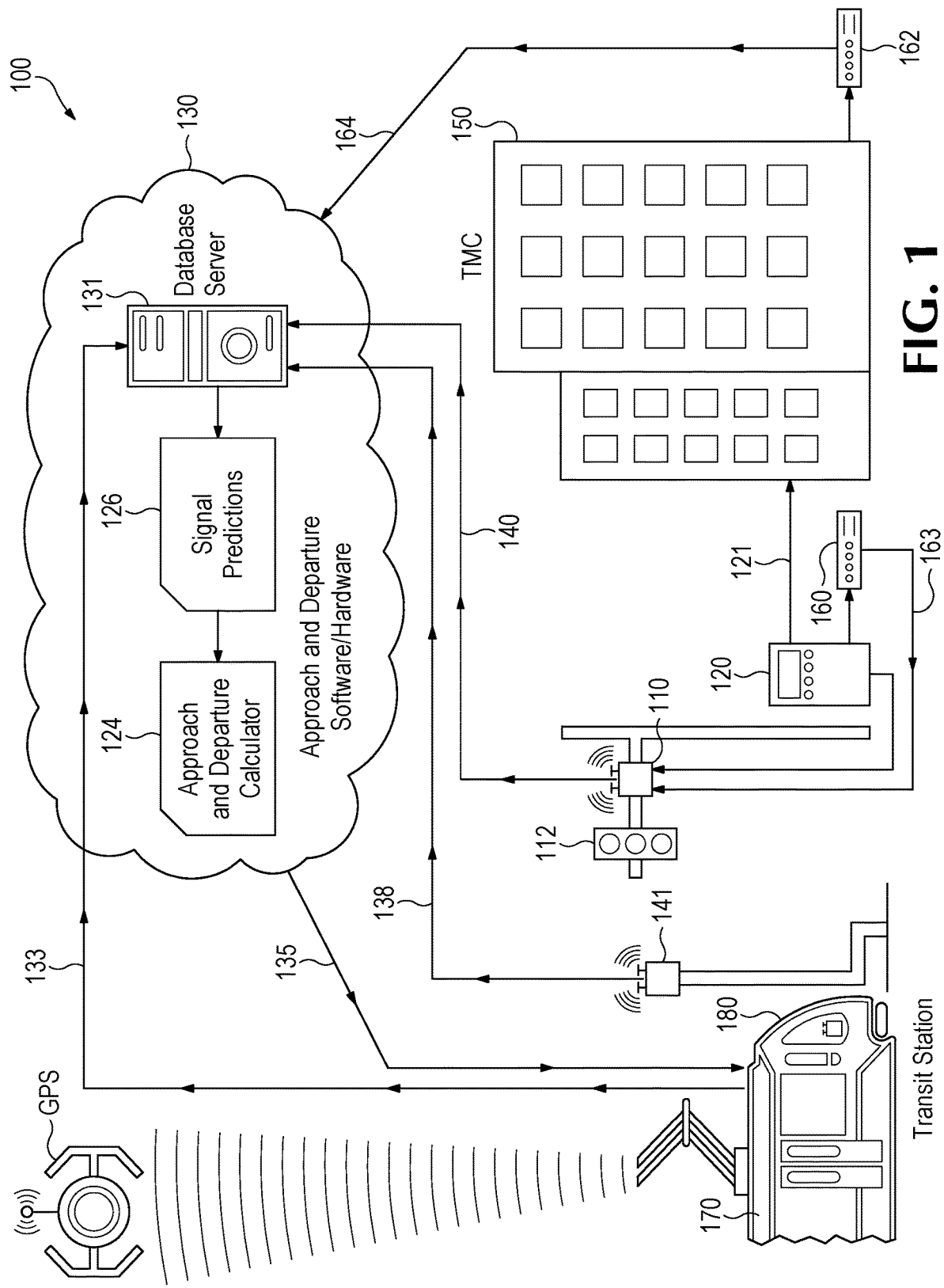
FIG. 1 is a simplified schematic or conceptual diagram of an approach & departure system for transit traffic control.

FIG. 1 illustrates an illustrative system 100 for connecting traffic signal control infrastructure, in-service transit vehicles, and backend computing and service systems, and providing an adaptable user interface, remotely effecting a change on a Portable Electronic Device (PED), verifying location of transit vehicles and tailoring information to the behavior of a transit operator. The PED (not shown) preferably is located in the transit vehicle 180 where it is observable by an operator. The system 100 includes a roadside unit (RSU) 110 or a similar device capable of acquiring a signalized intersection's current traffic signal phase and timing data in real-time, the duration for which this state will persist for each approach and lane, the next signal state switch time, and transmitting the data to the computer system 130 to support performing one or more of the processes described herein. The data may be transmitted, for example, in the form of a Signal Phasing and Timing (SPaT) message, as defined by the Society of Automotive Engineers (SAE) J2735 protocol. In some embodiments, the RSU 110 may acquire data from the traffic signal controller 120 on a second-by-second (or different frequency resolution) basis.

One objective of the exemplary computer system is to provide a smooth ride. A smooth ride may be measured by the reduced time spent accelerating and decelerating (reduce number of stops at non-station locations), and reduced time spent stopped at traffic signals.

Another objective of the present disclosure is to improve transit system serviceability by shifting a portion of stopping time from traffic signals to the stations, which will allow additional station boarding time. This will be beneficial for transferring passengers that arrive late, or for random arrival patterns, this extra time will lead to additional passengers boarding and ultimately will result in lower average passengers' trip time and delay.

An RSU 110, for the purposes of use within the preferred embodiment described herein, may implement the United States Department of Transportation (USDOT) Federal Highway Administration (FHWA) specification version 4.0 (or it's descendants), is capable of transmitting data through wireless means via Dedicated Short Range Communication (DSRC) mediums or non-DSRC technologies, including without limitation Radio-frequency Identification (RFID), Worldwide Interoperability for Microwave Access (WiMAX), Wi-Fi (Institute of Electrical and Electronics Engineers Standard Specification 802.11x), Bluetooth protocol, and cellular communication. Transmission of information between devices 110 and 120 may be accomplished via wired or wireless communication means, details of which are known.

The RSU 110 is capable of acquiring and transmitting a Geometric Intersection Description (GID) message (as defined in the Society of Automotive Engineers specification J2735) for example, or MAP data, to an exemplary computer system 130 configured to perform one or more of the processes described herein. Data transmission is illustrated in FIG. 1 via communication path 140.

Another embodiment for the exemplary computer system 130 to acquire SPaT and GID message data for a signalized intersection in real-time is by interfacing directly with the computer systems residing within a Traffic Management Center (TMC) 150, that are connected to and capable of monitoring traffic signal controllers within a specific geographic boundary. In an embodiment, a suitable controller or switch 162 may be coupled to the TMC 150 and configured to transmit data via path 164 to the computer system 30.

A separate RSU 141 or a similar device is located within a transit station perimeter and is capable of acquiring and transmitting GID message data regarding the location and layout of the transit station, the stopping point for the transit vehicle, and whether or not the transit vehicle moves forward to the signal stop line, or if the stop line for a signal is the same as the station stopping location. This data is transmitted to the computer system 130 as indicated path 138.

A portable electronic device (PED) 170 located within a transit vehicle acquires and transmits the transit vehicle location, heading and speed data to the exemplary computer system 130, for example, via communications path 133. PED 170 may obtain the global position system (GPS) location and heading data from an internal GPS receiver, or from the transit vehicle's GPS receiver, or automatic vehicle locator (AVL) system. PED 170 may obtain the vehicle speed data from the transit vehicle's on-board diagnostic system (not shown). Transmission of information between devices 110 and 130, 160 and 130, and 170 and 130 may be accomplished via DSRC or non-DSRC communication mediums.

In an embodiment, the exemplary computer system 130 comprises a database server 131 that is capable of receiving and storing the SPaT and GID data for each traffic signal, GID data for each transit station and transit route, and the real-time location and speed of the transit vehicle. The database server may also log data (for example, operational data, SPaT data, GID data, signal predictions, commands/recommendations history displayed on the PED, etc.) for post processing and system analyses.

In another embodiment, instead of requesting GID data messages from devices 110, 160 and/or 170, the intersection and transit GID data may be hard-coded into the database server 131. The system 130, in an embodiment, may include an approach and departure calculator component 124 (hardware, software or a combination), which is configured to execute the various processes and method described below, in particular with regard to FIGS. 2A-2D and FIGS. 3A-3B. The system 130 may also include a signal predictions component 126, which also may be implemented in hardware, software or a combination thereof. Signal predictions, in some embodiments, may be provided using technologies described in U.S. Pat. No. 9,396,657 assigned to Traffic Technology Services, Inc. and incorporated herein by this reference.

Based on the transit vehicle location and speed, the exemplary computer system 130 may calculate an expected arrival time at the next signal by comparing historical time-stamped traffic signal timing data against real-time signal status data to predict the signal interval and timing state for the next signal (or signals) which the transit vehicle is approaching. The exemplary computer system 130 may transmit the relevant advisory message to the transit vehicle through the PED 170 device or to a Mobile Data Terminal (MDT).

In general, the exemplary process takes place from when the exemplary computer system 130 receives the SPaT and GID data messages until it delivers advisory messages is provided in FIGS. 2A-2D and explained as follows. The logic illustrated in flow diagrams FIGS. 2A-2D, which is illustrative and not limiting, is first summarized below, and then described in more detail following the summary. The logic may be implemented in hardware, in software, in firmware, or in any combination thereof. Aspects may be implemented on board a vehicle, while other aspects may be implemented remotely or "in the cloud" as further explained herein. Thus, in some embodiments, the processes described may be distributed.

An exemplary process, by way of summary, may include the steps listed below. Note the following listing does not imply the processes or steps are executed seriatim. Rather, some processes may be executed in parallel, for example, in separate threads, and some processes are contingent on the results of various tests, decisions and calculations. Some steps will be executed in some conditions but not others. The processes are ongoing and variables change dynamically.

Process Steps.
Calculate estimated travel time to the first and second signals based on the current speed.
Check whether the transit vehicle can arrive during green at the next signal with the current speed.
Check whether the transit vehicle can arrive during green at the second next signal with the current speed.
Add cycle length to time to green of the second signal.
Reduce the speed by one (1) MPH or another selected adjustment.
Check whether the transit vehicle can arrive during green at the next signal with the minimum speed.
Check whether the transit vehicle arrives during red at the next signal with the current speed.
Check whether the transit vehicle arrives during red at the second to next signal with the current speed.
Add cycle length to time to green of the second signal.
Check whether the transit vehicle can arrive during green at the second next signal with the maximum speed.
Add cycle length to time to green of the first signal.
Check whether the transit vehicle can arrive during green at the next signal with the maximum speed.
Check whether the transit vehicle can arrive during green at the second next signal with the minimum speed.
Increase the speed by one (1) MPH or other selected delta.

An optimal speed advisory message calculated using the process described may be delivered via path 135 to a transit vehicle 180 through the on-board PED 170. The message may cause display of a message such as "DRIVE" or words to that effect and a numerical value indicative of the speed advisory, preferable along with a minimum and maximum advisory speed, expressed in configurable increments, as illustrated conceptually in FIG. 4. This recommendation may be updated by the exemplary computer system 130 on a second-by-second basis, or similar selected update period.

Figure 4:
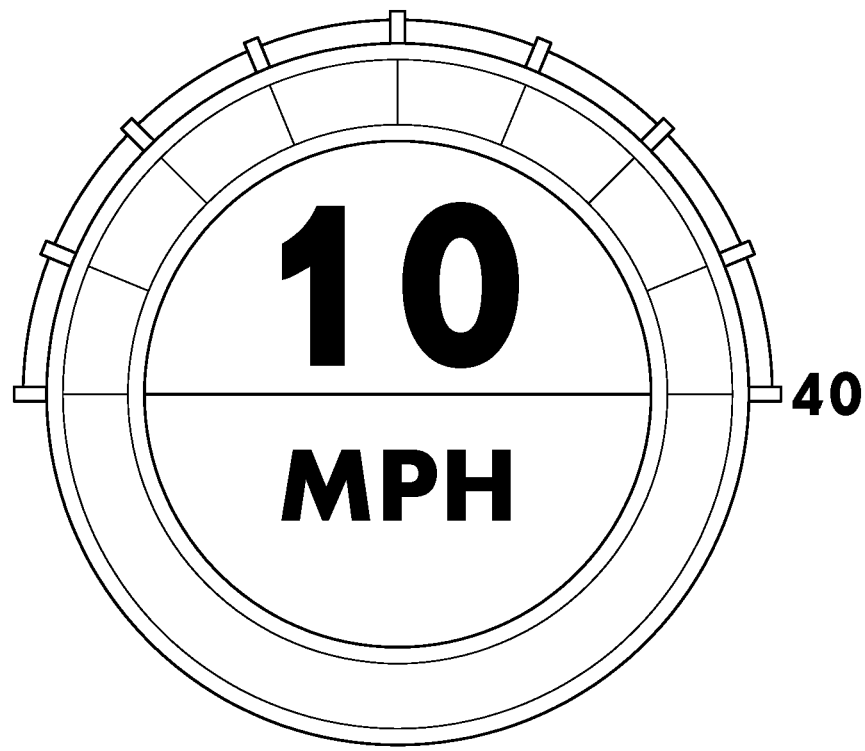
FIG. 4 is a pictorial representation illustrating the concept of the Graphical User Interface (GUI) for display of advisory messages related to optimal driving speeds to a transit vehicle operator on a second-by-second, or a different frequency basis through the in-vehicle display device or to a Mobile Data Terminal (MDT).
Figure 4:

FIG. 4 is a pictorial representation illustrating the concept of the Graphical User Interface (GUI) for display of advisory messages related to optimal driving speeds to a transit vehicle operator on a second-by-second, or a different frequency basis through the in-vehicle display device or to a Mobile Data Terminal (MDT).

Figure 5:
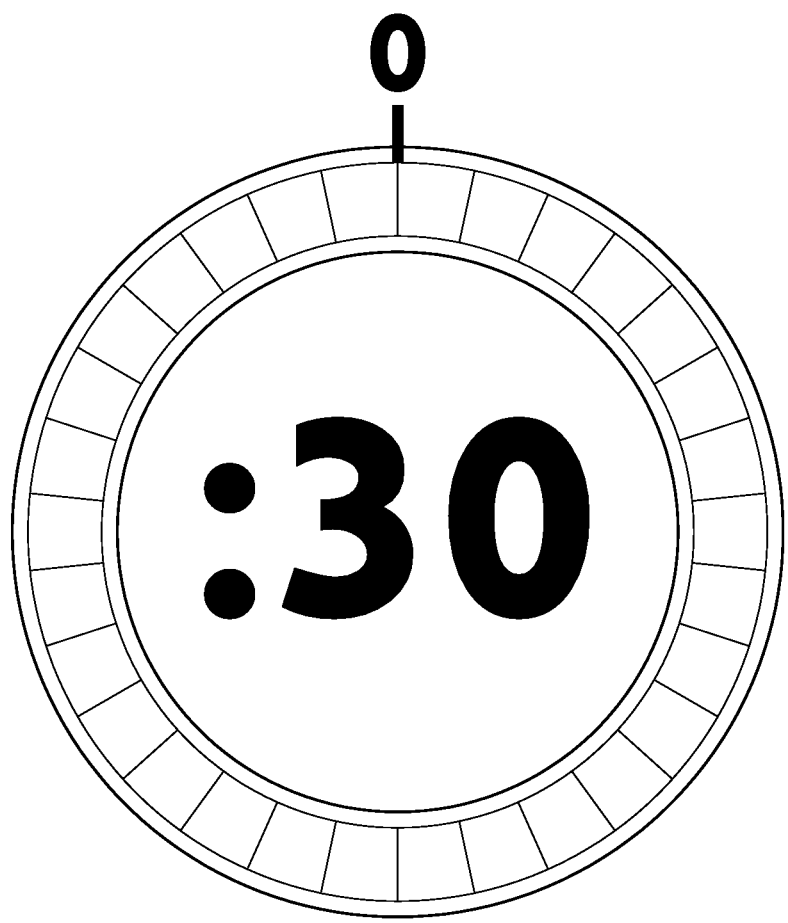
FIG. 5 is a pictorial representation illustrating a concept of the GUI for display of advisory messages related to remaining time of the red phase to the transit vehicle operator through the in-vehicle display device or to a Mobile Data Terminal (MDT) on a second-by-second or different frequency basis.
Figure 5:

The exemplary computer system 130 may also transmit the remaining time of the red phase to the transit vehicle operator through the on-board PED 170 on a second-by-second basis. The on-board PED 170 may display a message "TIME TO GREEN" with a countdown timer, as illustrated conceptually in FIG. 5. FIG. 5 is a pictorial representation illustrating a concept of the GUI for display of advisory messages related to remaining time of the red phase to the transit vehicle operator through the in-vehicle display device or to a Mobile Data Terminal (MDT) on a second-by-second or different frequency basis.

Figure 6:
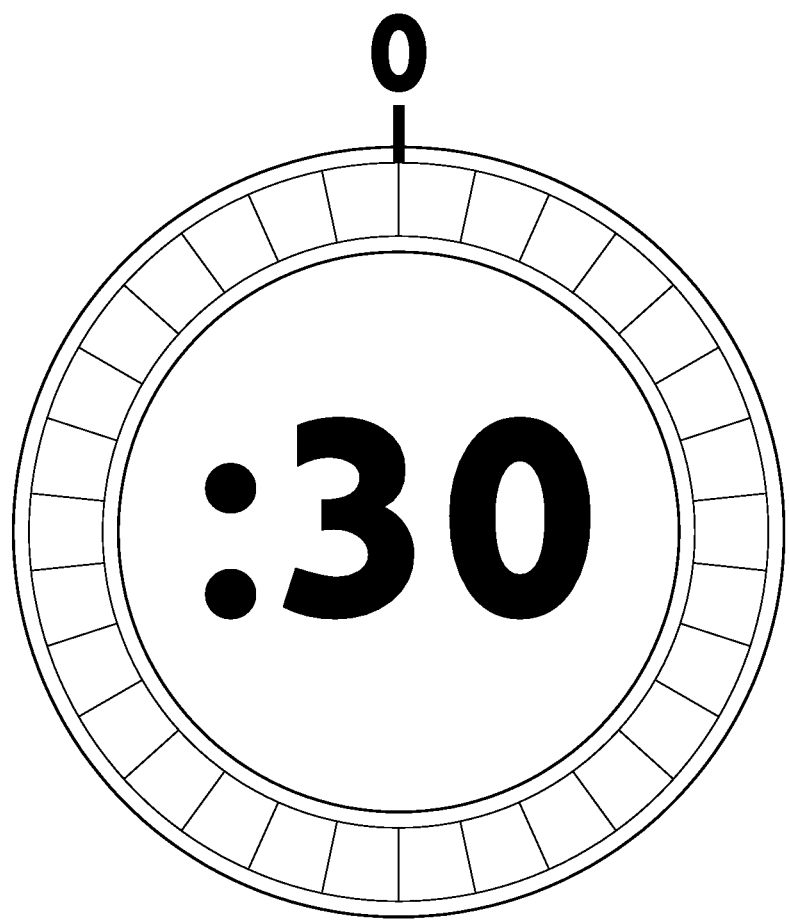
FIG. 6 is a pictorial representation illustrating a concept of the GUI for display of advisory messages related to the additional time that the transit vehicle should wait before leaving through the in-vehicle display device or to a Mobile Data Terminal (MDT) on a second-by-second or different frequency basis.

The exemplary computer system 130 may also transmit a station boarding and/or alighting duration advisory message to the transit vehicle operator through the on-board PED 170 on a second-by-second basis, as illustrated conceptually in FIG. 6, along with a message that display's "WAIT FOR" with a countdown timer. FIG. 6 is a pictorial representation illustrating a concept of the GUI for display of advisory messages related to the additional time that the transit vehicle should wait before leaving through the in-vehicle display device or to a Mobile Data Terminal (MDT) on a second-by-second or different frequency basis.

The exemplary computer system 130 may also transmit a departure window advisory message to the transit vehicle operator through the on-board PED 170 on a second-by-second basis, as illustrated conceptually in FIG. 6, along with a message that display's "LEAVE NOW" with a countdown timer.

Upon receiving a specific advisory message, the transit vehicle operator may take one of many actions, including maintaining current speed and heading, increasing speed, decreasing speed, release of the accelerator in anticipation of a stop, apply brakes, or wait/do nothing, such as in the case were the recommendation is to wait at the station for additional time, or in the case when the transit vehicle is stopped at a red traffic signal.

Next, we describe the illustrative logic of FIGS. 2A-2D in more detail, beginning with a dictionary of variable names. We refer herein to LRT, train, and vehicle interchangeably except as otherwise noted explicitly. The units shown (sec, ft, etc.) are used in some embodiments but are not limiting. Any appropriate units may be used.

TABLE 1

VARIABLE DICTIONARY

| | |
|---|---|
| CI: | Clearance Interval; a fixed value (sec) |
| CL1: | Cycle Length of the next downstream signal (sec) |
| CL2: | Cycle Length of the 2nd next downstream signal (sec) |
| Δ: | Dummy variable for additional dwell time recommendation (sec) |
| D1: | Distance from LRT current location to the next signal (ft) |
| D2: | Distance from LRT current location to the 2nd next signal (ft) |
| DS1: | Distance from LRT current location to the next Station (ft) |
| DS2: | Distance from LRT current location to the 2nd next Station (ft) |
| ETT1: | Estimated Travel Time, based on LRT current speed, to the next signal (sec) |
| ETT2: | Estimated Travel Time, based on LRT current speed, to the 2nd next signal (sec) |
| GI1 | Green Interval for the next LRT signal phase, not including amber phase (sec) |
| Gl2: | Green Interval for the 2nd next LRT signal phase, not including amber phase (sec) |
| MaxTT: | Maximum Travel Time, based on LRT minimum speed (sec) |
| MinTT: | Minimum Travel Time, based on LRT maximum speed (sec) |
| P: | Real time LRT front Position from origin (ft) |
| PRT: | Driver Perception Reaction Time (sec) |
| S: | Real time LRT Speed (mph) |
| Smin: | Minimum LRT operational Speed (variable, used 10 mph) |
| Smax: | Maximum LRT operational Speed (variable, used 25 mph) |
| t: | time step (an arbitrary fraction of sec) |
| TTG1: | Time To Green of the next downstream signal (sec) |
| TTG2: | Time To Green of the 2nd downstream signal (sec) |

Figure 2A:
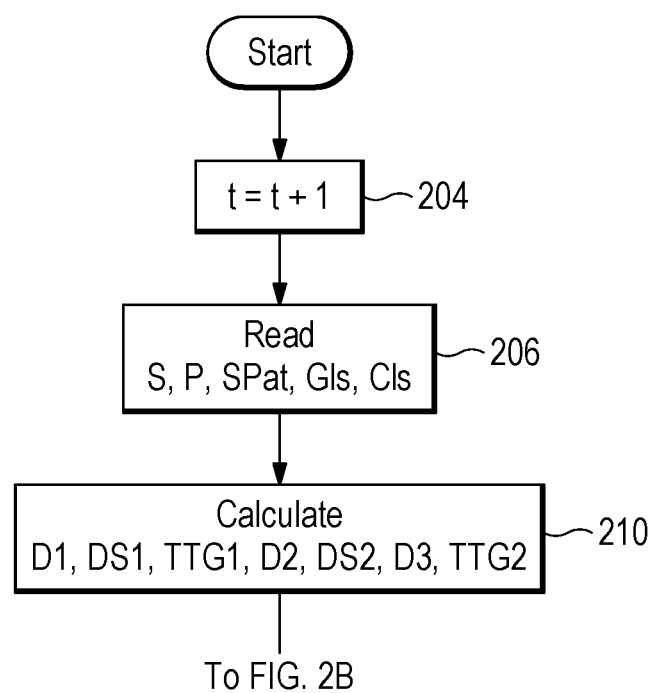
FIG. 2 (comprising FIGS. 2A-2D) is a simplified transit control logic flow diagram illustrating logic flow for the derivation of the optimum speed, red-light duration, station boarding & alighting duration, and departure window advisories for transit vehicles.

Referring Now to FIG. 2A

At block 204, the exemplary process iterates to a next time step, t=t+1. At block 206, the exemplary process receives input from the transit vehicle (speed, position, GID, etc.) and traffic signal controllers (120) (SPaT and GID) described above. At block 210, the exemplary process calculates a transit vehicle's real-time distance to the next station DS1, distance to the next signal(s) D1 prior to the next station, and time to green phase of the next signal(s) TTG1 prior to the next station, assuming travel at the current speed. Additional variables may be calculated as illustrated at block 210.

Figure 2B:
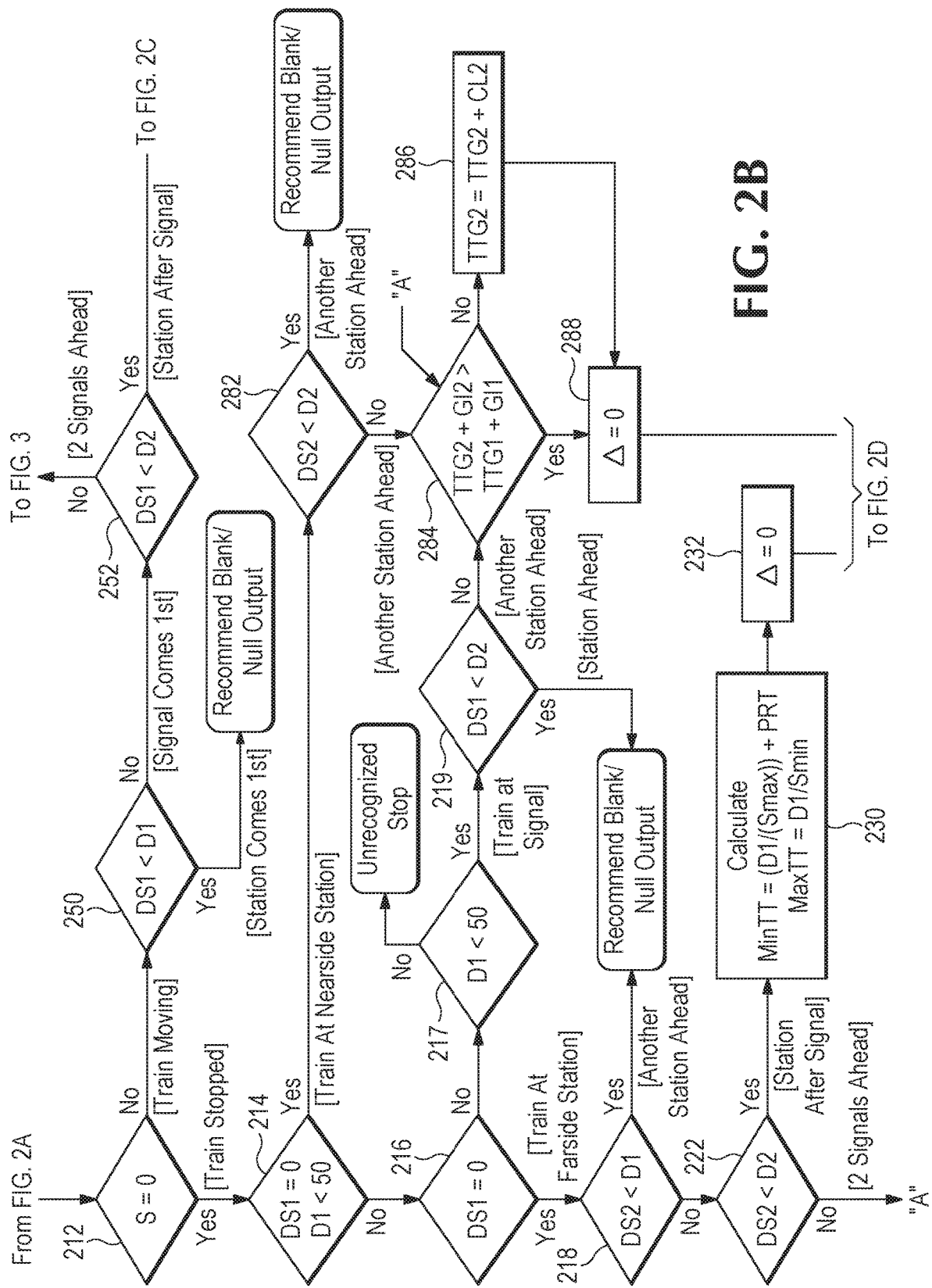

Referring Now to FIG. 2B

Train Is Stopped

Proceeding from block 210, we will next describe the decision path vertically downward in the figure from decision 212. At decision 212, the process checks whether the transit vehicle is stopped (S=0) or moving. If the train is stopped (YES branch from 212), the process checks at decision 214 whether the transit vehicle is stopped at a nearside station (station next to signal). If NO, at decision 216, the process checks whether the transit vehicle is stopped at a far-side station (isolated station) DS1=0. Otherwise, proceed to decision 217 discussed below.

If YES path from decision 216, the train is at farside station, then at decision 218 the process checks the position of the next station (DS2<D1?). That is, is the distance to the second next station DS2 less than the distance D1 to the next signal. Put another way, will the vehicle arrive at the second next station before it arrives at the next signal. If NO, the next decision 222 checks if the distance DS2 is less than D2, the distance to the second next signal. If there is not another station ahead before the next signal (NO branch from 218), decision 222 determines if (DS2<D2); that is, is there is a station at a distance DS2 before (closer than) the second next signal at D2. If YES, (station after signal), continue to block 230 and calculate MinTT and MaxTT, the travel times over distance D1 to the next signal. Then initialize Δ to 0, block 232, and proceed to 240 (see FIG. 2D). In the case of NO branch from 222, it indicates two signals ahead (no intervening station), follow terminal "A" to decision 284.

Train Is Moving

Returning to decision 212, if the train is moving (branch NO), proceed to decision 250 to determine whether a station comes first before the next signal. If so (YES branch), "Recommend Blank—Null Output"—i.e., do not send an advisory message. Alternatively, if a signal comes first before the next station (NO branch from 250), the process checks at decision 252 whether the next station comes before a second next signal (DS1<D2). If NO, there are (at least) two signals ahead. The logic continues in FIG. 3.

Figure 2C:
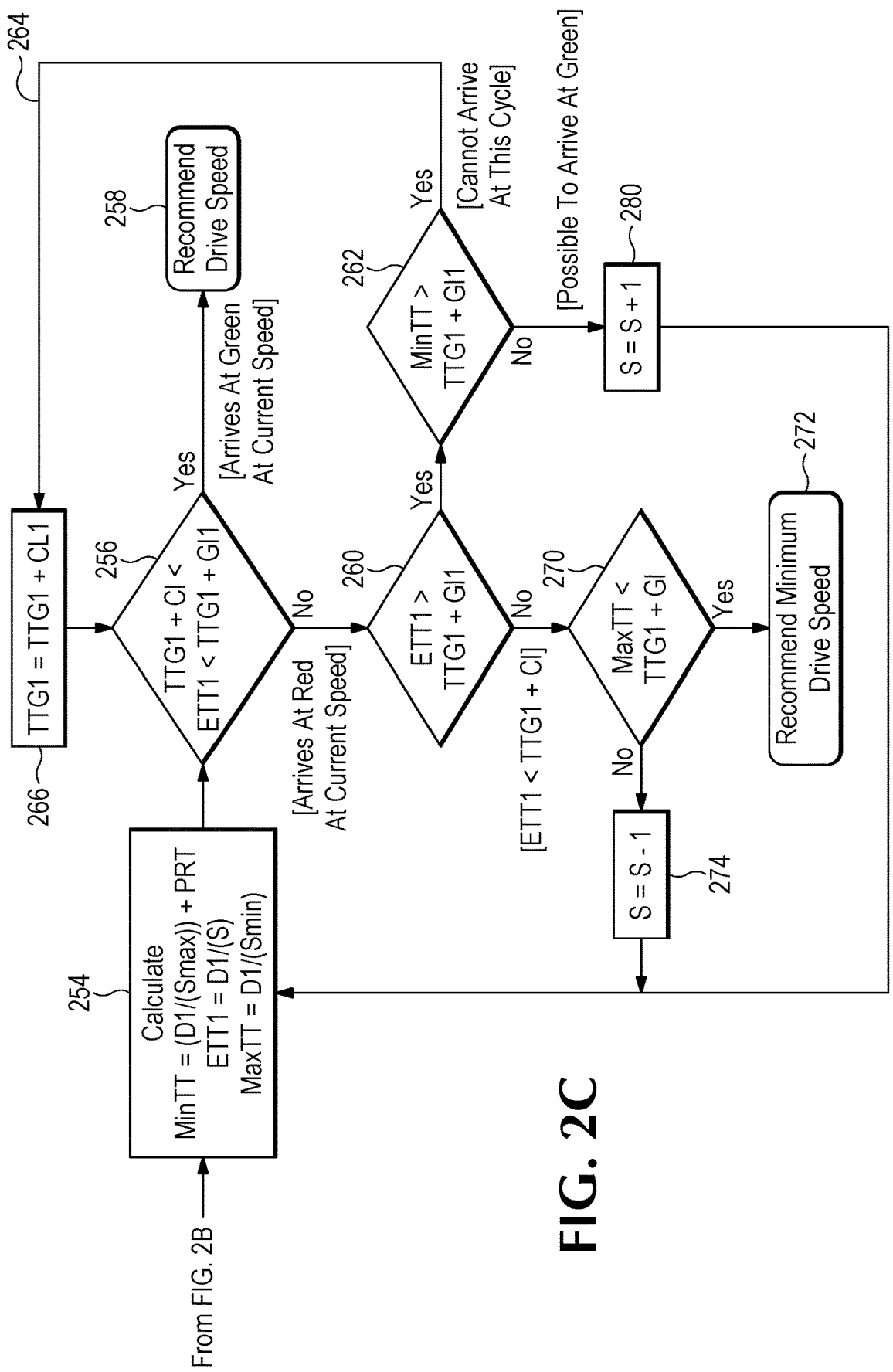

Referring Now to FIG. 2C

Alternatively, at 252, if YES (station after signal), the logic flow proceeds to block 254 and calculate MinTT (Minimum Travel Time, based on LRT maximum speed), ETT1 (Estimated Travel Time, based on LRT current speed (S), and MaxTT (Maximum Travel Time, based on LRT minimum speed). Then the question is, at decision 256, is the vehicle going to arrive during the green period using the current speed (S)? If YES from 256, the system may send an advisory message to maintain the current speed, advisory message 258.

If NO branch from 256, the vehicle is predicted to arrive during red state at the current speed. Then at decision 260, the process checks whether the estimated travel time to the next signal (based on current speed) exceeds the time to green state of the next signal plus the green interval for the next signal phase GI1 If YES, would the minimum travel time MinTT exceed the green state time (TTG1+GI1)?— decision 262. YES branch indicates vehicle cannot arrive in time for green on this cycle. In that case, the logic proceeds via—path 264 to increment the TTG1=TTG1+CL1, adding the cycle length of the next downstream signal, block 266. Next, the process returns to decision 256 to again test for arrival (moving at the current speed) during the revised time to green. See preceding paragraph.

Referring now to the decision 260 NO path, where the travel time to the next signal does not exceed TTG1+GI1. That is, the vehicle is predicted to arrive during the green signal state. Next decision 270 checks whether the maximum travel time MaxTT, based on the vehicle minimum speed, would still arrive during the green state. If so (YES branch), the logic sends an advisory message 272 recommending operation at the minimum drive speed.

In a case of the NO branch from 270, the logic decrements the speed value (S=S−1) at block 274 and loops back to block 254 to re-calculate MinTT, ETT1 and MaxTT using the new (lower) speed value. The new values are examined at 256 and the process continues as described above.

Returning to decision 262, in a case of the NO branch, it indicates that MinTT is not greater than the time to green TTG1+GI1 interval for the next signal phase (excluding amber phase). The logic proceeds to increment the speed value S=S+1 at block 280. The logic then loops from 280 back to block 254 to re-calculate the variables shown using the revised speed value, and then continue the process as described above. This concludes description of FIG. 2C.

Returning to decision 214, if the train is stopped at a nearside station (DS1=0 and D1<50), proceed to decision 282 to determine if another station is ahead (YES) or another signal is ahead (NO). If another station is ahead, no output message is required. Alternatively, if there is another signal is ahead, proceed to decision 284. Here we determine if the time to green at the second downstream signal (TTG2) plus the green interval (GI2) is greater than the time to green of the next downstream signal (TTG1) plus the green interval (GI1). This process helps ordering signals and their green intervals in temporal sequence. In other words, we must travel through signal 1 before going through signal 2. Therefore, the green window at signal 1 has to come before that of signal 2. Otherwise, the logic moves back one cycle at signal 2. If NO, proceed to block 286 to set TTG2=TTG2+CL2. Then set Δ=0 at block 288 and continue to block 290 to calculate speed as discussed below.

Another logic path flows from decision 216, in a case where the train is stopped (we used train and vehicle interchangeably, both in a generic sense). Here, path NO from 216 indicates the train is not at a farside station, and decision 217 determines the train is at or near a signal (D1<50). If YES, train is at a signal, then decision 219 determines whether there is another signal ahead (NO branch), or there is a station ahead (YES branch). In the latter case, station ahead, no output message need be given.

Alternatively, from 219 NO branch (another signal ahead), the logic proceeds to decision 284 which, as mentioned above, determines if the time to green at the second downstream signal (TTG2) plus the green interval (GI2) is greater than the time to green of the next downstream signal (TTG1) plus the green interval (GI1). If yes branch from 284, delta is set to 0 at block 288, and we proceed to block 290 discussed with regard to FIG. 2D. If NO branch from 284, the logic proceeds to decision 286, as discussed above.

Figure 2D:
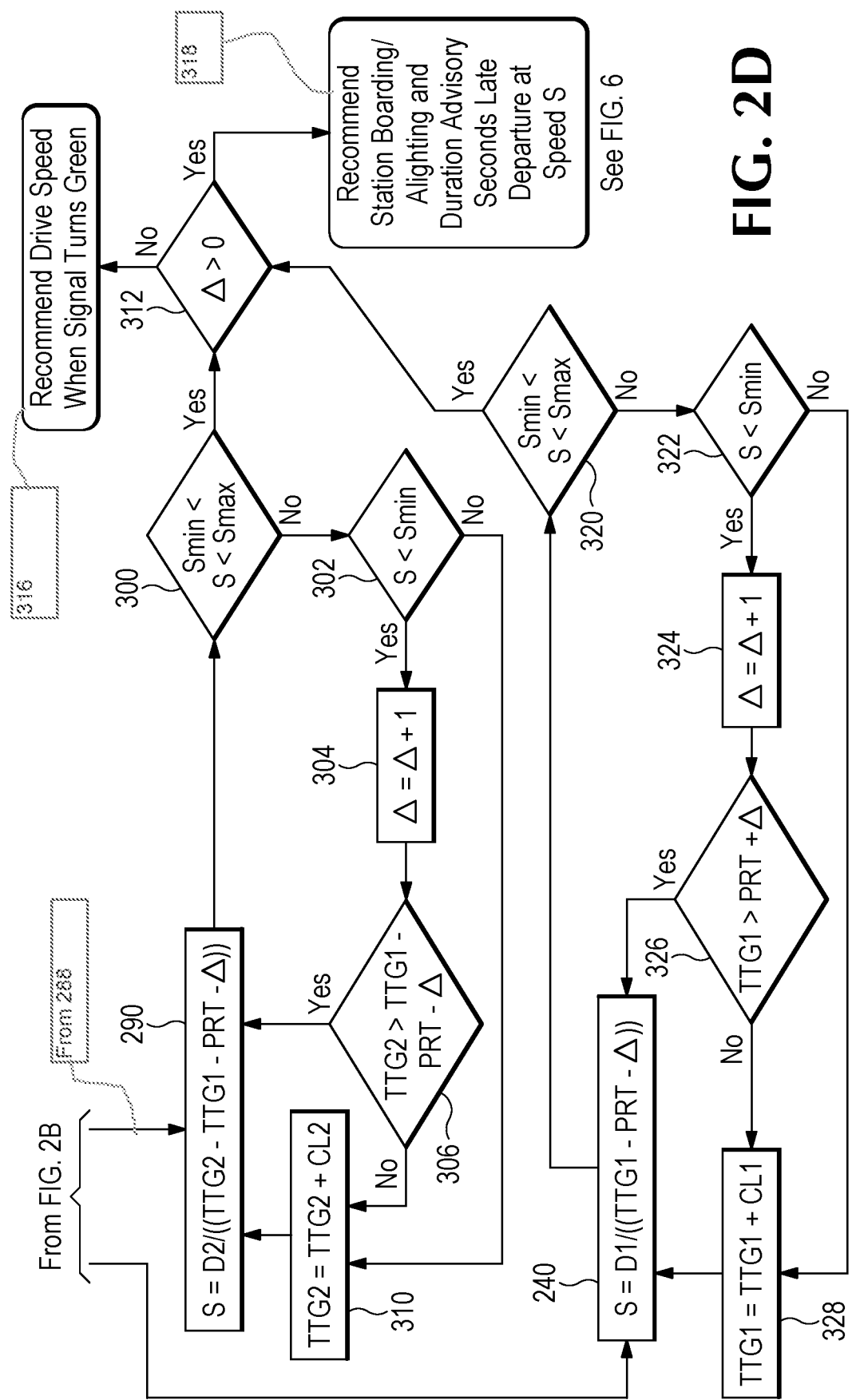

Referring Now to FIG. 2D

Referring to FIG. 2D, with begin with block 290 and related loop. To arrive at 290 in the logic flow, the train is stopped (212) and there is another (second) signal ahead (see 282 and 219). Next is speed calculation at block 290: S=D2/((TTG2−TTG1−PRT−Δ)). This speed S would appear to get the train to the second signal at the start of its green interval, based on starting from the first signal and allowing for PRT and a dwell time Δ.

Next, decision 300 determines whether the calculated speed S is within the operational speed limits (Smin<S<Smax). If NO, then check whether S is below the minimum Smin, decision 302. If YES, delta is incremented at block 304, Δ=Δ+1 to add dwell time. Next, decision 306 checks whether (TTG2>TTG1−PRT−Δ) (using the adjusted Δ value. If YES, loop back to block 290 and re-calculate speed S. If NO branch from decision 306, proceed to block 310 to set TTG2=TTG2+CL2, and then the logic loops back to 290. Referring again to decision 302, if the calculated speed S is not below the minimum operational value Smin, the process proceeds to 310 without adding dwell.

The re-calculation of tentative speed S at block 290 may loop via 300, 302, 310 multiple times to arrive at an appropriate speed within range, then exit decision 300 YES branch. If the resulting dwell Δ is still =0(Δ>0 NO) at decision 312, then an advisory message, block 316, is sent recommending the drive speed S when the current signal turns green. If the dwell is greater than 0 (YES branch from 312), then an advisory message is sent recommending station boarding/alighting and duration to effect a late departure Δtime late, at speed S. That logic addresses the train stopped at station cases—considering next upcoming signals or stations.

In another case, see decision 222, there is a station after the present signal, the min and max travel times to the station are set, block 230, and the dwell time Δ is initialized to 0, block 232. Then a speed S is calculated as shown in block 240, for arriving at green state at the next signal. The result S is checked at decision 320 whether the calculated speed S is within the operational speed limits (Smin<S<Smax). If NO, then check whether S is below the minimum Smin, decision 322. If YES, increment Δ=Δ+1 at block 324.

Next decision 326 examines whether TTG1>PRT+Δ. If YES, return to block 240 to re-calculate speed S. If NO, set TTG1=TTG1+CL1 at block 328 and then loop back to 240.

FIG. 3

Figure 3A:
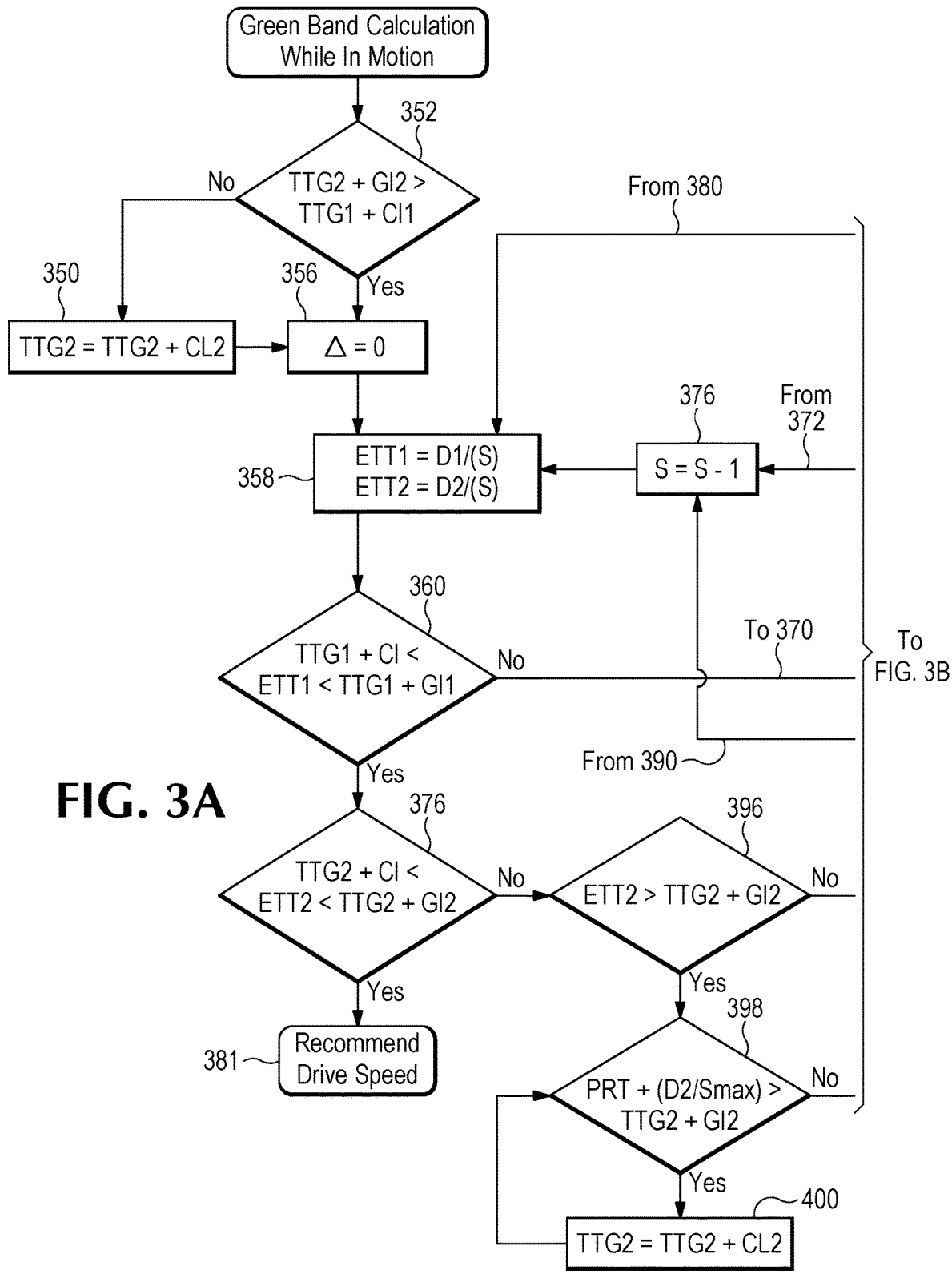
FIG. 3 (comprising FIGS. 3A-3B) is a simplified flow diagram elaborating a process for the calculation of an optimal green band through traffic signals for a transit vehicle when the vehicle is in motion.
Figure 3B:
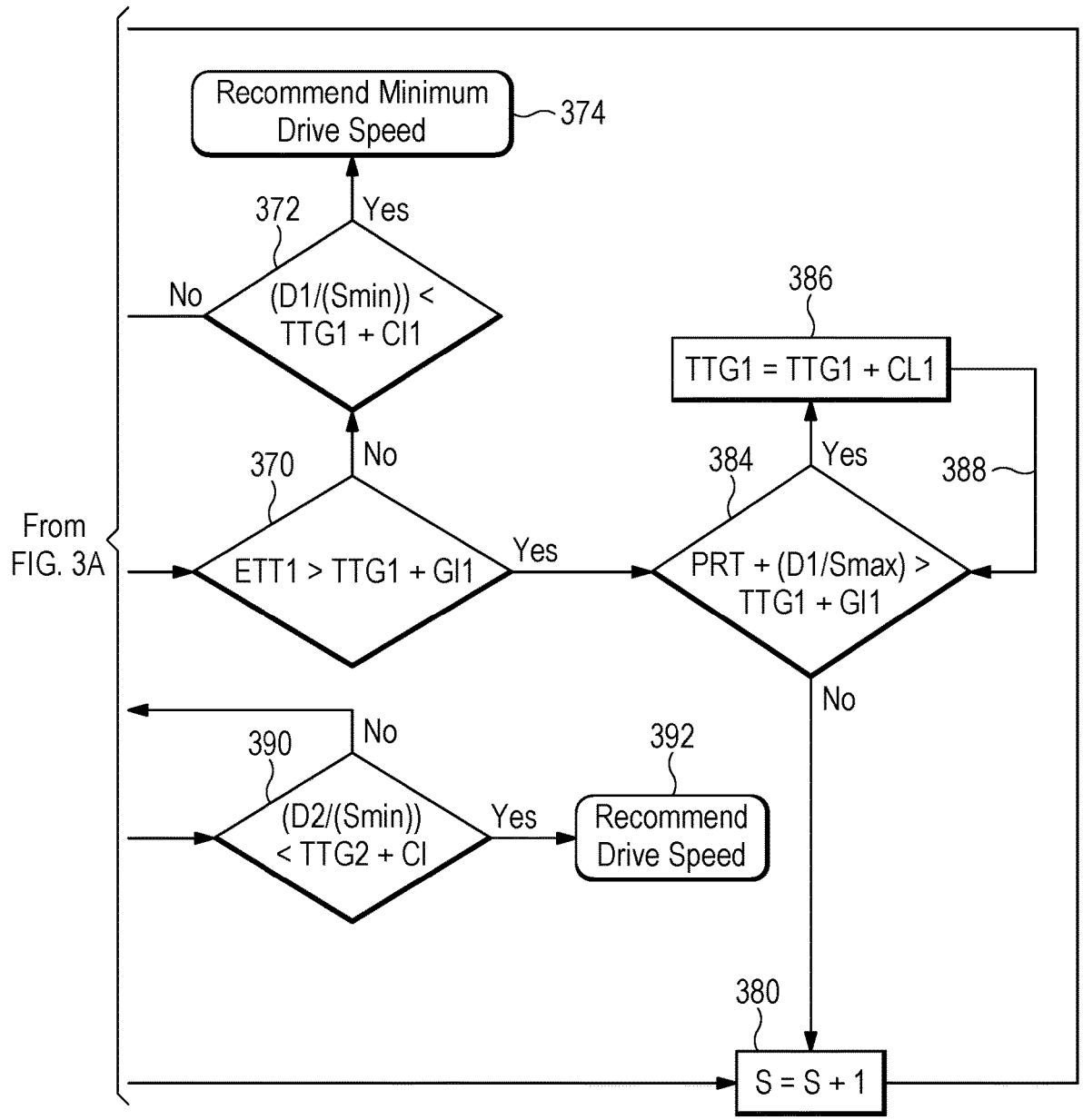
Figure 7:
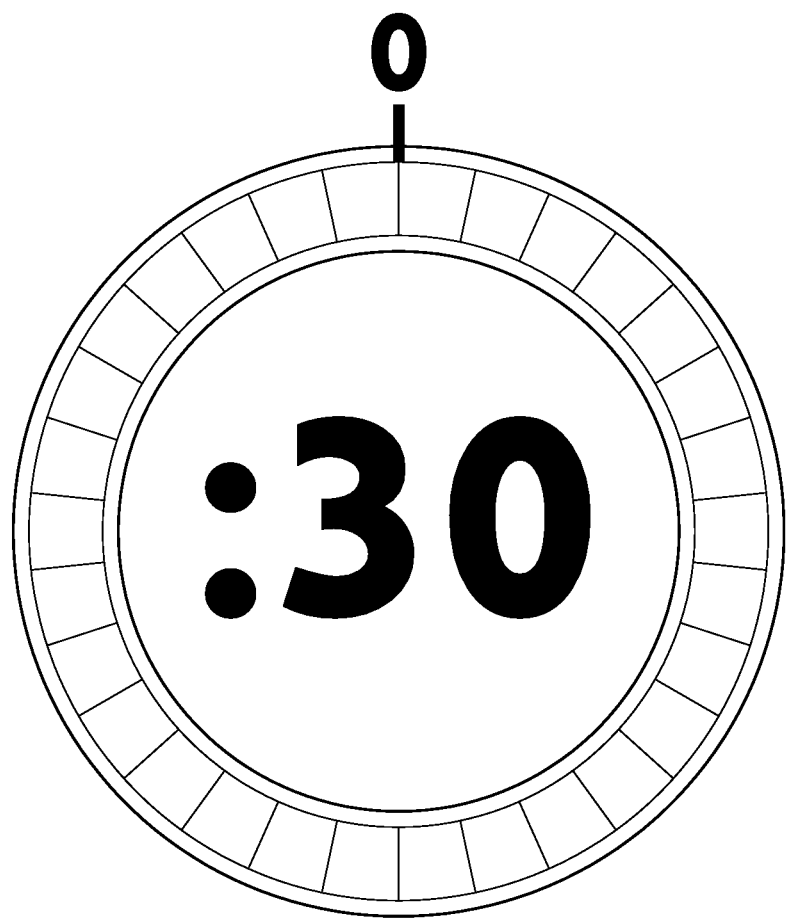
FIG. 7 is a pictorial representation illustrating a concept of the GUI for display of advisory messages related to the latest time that the transit vehicle may depart the station through the in-vehicle display device or to a Mobile Data Terminal (MDT) on a second-by-second or different frequency basis.
Figure 7:

Overall, the processes of FIGS. 2 and 3 are arranged to determine an "optimal window" for a transit vehicle to travel through the maximum number of consecutive traffic signals during the green vehicular phase. That is, the system determines and sends a recommended speed to traverse the optimal window. FIG. 3A-3B is an extension of FIG. 2 that explains the logic and computations when the train is in motion. In a case where an optimal window is not possible under current circumstances, the system determines and then advises the driver to remain at the current station until such window opens up. It provides a message such as in FIG. 6 indicating a time to wait, and then in FIG. 7 indicating "Leave Now" at the conclusion of the wait period.

Referring now to FIG. 3A, decision 352 determines whether a current time to green plus green interval for the second signal is longer than for the first signal. Put another way, which green signal would be reached first at the present speed. If no, time to $2^{nd}$ signal is not longer, go to next cycle, block 350 TTG2=TTG2+CL2. Either way, dwell time (Δ) is initialized to zero, block 356.

Next, calculate travel times to each signal at the current speed, block 358. Next determine whether TTG1+CI (clearance interval)<ETT1<TTG1+GI1 at decision 360, so do we reach #1 during green state? If, NO—go to decision 370, FIG. 3B.

Returning to decision 360, if yes (vehicle reach signal #1 during green state), proceed to decision 376. Is the time ETT2 short enough to arrive at #2 during green state (TTG2+CI<ETT2<TTG2+GI2) If yes, recommend drive speed (S) at 381. This speed will traverse through #1 and #2.

Turning to FIG. 3B, again referring to decision 370, if YES (travel time to #1 too long), can we make it at speed Smax, see decision 384; is that still too late? If YES—go for the next green cycle, i.e., add CL1 to TTG1, block 386. Next, loop 388 to check again, if necessary add more cycles until timely arrival traveling at Smax. When result is NO, proceed to 380, increment speed S=S+1, loop back (to FIG. 3A) and re-calculate travel times, block 358 and continue. The process will fall through 360 and 376 if timing is adequate to get through both signals. Then send recommended speed S at 381 as noted.

If NO result from 370, go to decision 372; is the distance D1/Smin (time to #1 at min speed) less than TTG1+CI1, so the vehicle will arrive before the green state? If YES,— recommend min drive speed, block 374. If 372=NO, return to FIG. 3A, and decrement speed S=S−1, block 376. Then return to re-calculate expected travel times as before at block 358.

In a case that ETT2 is NOT>TTG2+GI2 (NO from decision 396), then we can arrive during green at speed S. That is, at decision 390, check whether speed Smin is fast enough to cover the distance D2 within TTG2+CI. If YES from 390, recommend drive speed S at 392. If NO from 390, return to FIG. 3A, block 376, and proceed as described above.

Referring to decision 396 in FIG. 3A, if the travel time ETT2>TTG2+GI2 (YES), proceed to 398 to see if the travel time will be longer than the green window, PRT+(D2/Smax) >TTG2+GI2? If YES, will have to wait to the next cycle, block 400, reset TTG2=TTG2+CL2. Then loop to re-test at 398.

Figure 8:
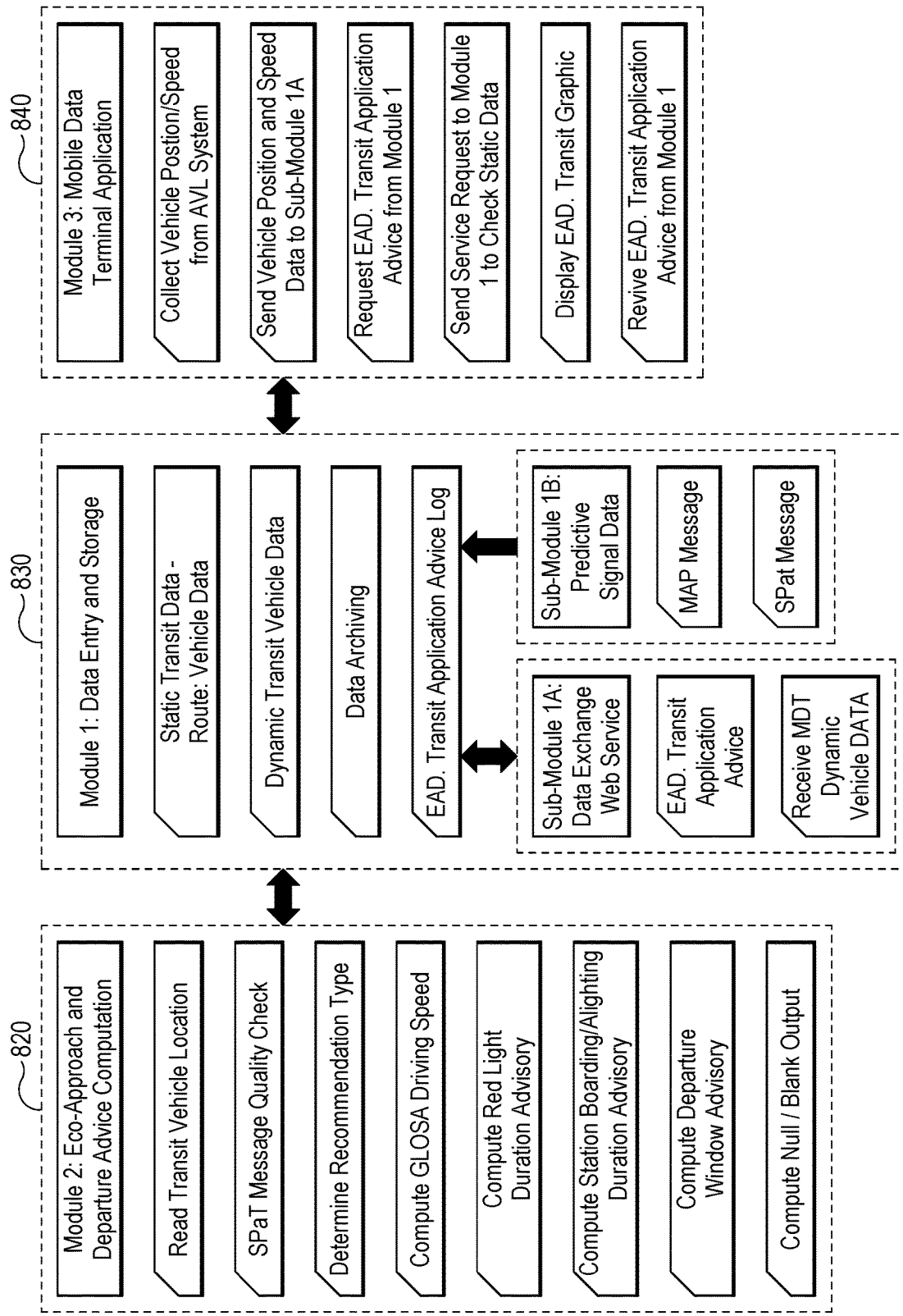
FIG. 8 is a simplified schematic or conceptual diagram of the exemplary computer system for providing real-time and predictive speed, traffic signal timing, station dwell time, and departure window information to transit vehicles.

FIG. 8 is a simplified schematic or conceptual diagram of the exemplary computer system for providing real-time and predictive speed, traffic signal timing, station dwell time, and departure window information to transit vehicles. In one embodiment, the system may comprise a data entry and storage module 830, an approach and departure advice computation module 20, and a mobile data terminal application 840. The application 840 may be executable on a mobile terminal located in a transit vehicle for example, in the context of FIG. 1. The functions listed in each module are explained in more detail above with regard to FIGS. 1-7. In a preferred embodiment, the functions listed may be implemented by the corresponding logic shown in the flow diagrams described above.

It will be obvious to those having skill in the art that many changes may be made to the details of the above-described embodiments without departing from the underlying principles of the invention. The scope of the present invention should, therefore, be determined only by the following claims.

The invention claimed is:

1. A method comprising:
provisioning a computer system, the computer system including a database server to store, access and update data;
storing in the database server transit vehicle route data describing a transit vehicle route including locations of traffic signals and transit stations along the route;
in the computer system, implementing an iterative process to acquire real-time traffic signal state data from the traffic signals along the route;
updating the acquired real-time traffic signal state data on second-by-second or similar frequency basis;
in the iterative process, acquiring real-time position and speed data from the transit vehicle operating on the transit system route;
updating the acquired real-time position and speed data on second-by-second or similar frequency basis;
in the computer system, calculating expected arrival times of the transit vehicle at next downstream stations and signals along the route based on the stored route data and the current updated position and speed data from the transit vehicle;
in the computer system, calculating a recommended speed for the transit vehicle to travel through a maximum number of consecutive downstream traffic signals along the route during respective green signal phases of the downstream traffic signals based on the acquired real-time position and speed data, calculated estimated travel times to the downstream traffic signals and signal predictions for the downstream traffic signals;
transmitting a first advisory message to the transit vehicle in real time, the first advisory message including the recommended speed;
receiving the first advisory message onboard the transit vehicle;
generating a first screen display in the transit vehicle based on the first advisory message, the first screen display including an indication of the recommended speed, and/or providing the first advisory message to an autonomous vehicle longitudinal control system;
in the computer system, in a case where a recommended speed is not possible under current circumstances, determining a station dwell time that the transit vehicle should remain at the current location;
sending a second advisory message to the transit vehicle, the second advisory message including the station dwell time;
receiving the second advisory message onboard the transit vehicle; and
generating a second screen display based on the second advisory message, the second screen display including an indication of the station dwell time, and/or providing the second advisory message to an autonomous vehicle longitudinal control system.

2. The method of claim 1 including:
recalculating the recommended speed on a second-by-second or similar frequency basis;
transmitting an additional first advisory message to the transit vehicle each time the recommended speed is recalculated to communicate the recalculated recommended speed; and
in the transit vehicle, updating the first screen display based on a latest one of the additional first advisory messages, and/or providing the latest one of the additional first advisory messages to an autonomous vehicle longitudinal control system for controlling the transit vehicle.

3. The method of claim 1 including, in the transit vehicle, updating the real-time position and speed data at a frequency of about once per second and, after each update, transmitting the updated real-time position and speed data to the computer system.

4. The method of claim 1 including, in the computer system, executing the steps of:
based on the real-time position and speed data acquired from the transit vehicle, determining Signal Phasing and Timing, Green Intervals, and Cycle Intervals for a next downstream signal and for a second downstream signal along the transit vehicle route;
calculating values of variables Distance from the current position to the next downstream signal, Distance from the current position to a next downstream Station, Time to Green of the next downstream signal, Distance from the current position to the second downstream signal, Distance from the current position to a second downstream station, and Time to Green of the second downstream signal;
based at least in part on the calculated values of the variables:
determining whether the transit vehicle is moving;
if the transit vehicle is stopped, determining whether the transit vehicle is stopped at a farside station, wherein the farside station is downstream of a traffic signal;
if the transit vehicle is stopped at farside station, determining whether the second downstream station is next downstream along the route before a second downstream signal;
if another station is not next along the route, determining whether there is a station after the traffic signal, or there are two consecutive signals downstream from the current location of the vehicle along the route;
if there are at least two consecutive traffic signals downstream from the current location of the vehicle, determining whether a time to green of the second downstream signal plus the green interval of the second downstream signal is greater than the time to green of the next downstream signal plus a green interval of the next downstream signal;
if the determination is yes, initialize a dummy variable Δ=0 for additional dwell time;
calculating a speed as equal to a distance from the transit vehicle current location to the second downstream signal divided by a quantity, where the quantity is determined as: (Time To Green of the second downstream signal) minus (Time To Green of the next downstream signal) minus (a predetermined Driver Perception Reaction Time) minus a (current value of the dummy variable);
testing whether the calculated speed is between predetermined min and max values to obtain a result; and
if the testing result is that the calculated speed is between the predetermined min and max values, and the transit vehicle is stopped, transmitting a message to the transit vehicle recommending that the transit vehicle drive at the calculated speed when the signal at which the transit vehicle is stopped turns green.

5. The method of claim 4 including:
if the testing result indicates that the calculated speed is below a predetermined minimum, incrementing the dummy variable value and then testing whether Time To Green of the second downstream signal is greater than the Time To Green of the next downstream signal minus the Driver Perception Reaction Time minus the dummy variable value so as to determine a result;
if the result is yes, updating the recommended transit vehicle speed to equal=Distance from the transit vehicle current location to the second next signal divided by a second quantity, the second quantity calculate as ((Time To Green of the second downstream signal minus Time To Green of the next downstream signal minus the Driver Perception Reaction Time minus the dummy variable value;
testing whether the updated recommended transit vehicle speed is within predetermined minimum and maximum bounds; and
if the updated recommended transit vehicle speed is within said bounds and the transit vehicle is stopped, transmitting a new advisory message to the transit vehicle, wherein the new advisory message includes a recommendation to drive at the updated recommended transit vehicle speed when the signal at which the transit vehicle is stopped turns green.

6. The method of claim 1 including, in the computer system, executing the steps of:
reading the current speed, position, Signal Phasing and Timing, Green Intervals, and Cycle Intervals for a next downstream signal and for a second downstream signal along the route based on the stored route traffic management data;
calculating values of variables Distance to next signal, Distance to next Station, Time to Green of next signal, Distance to second signal, Distance to second Station, Time to Green of second signal;
based at least in part on the calculated values of the variables:
determining whether the transit vehicle is moving;
if the transit vehicle is moving, determining whether a station is next or a signal is next;
if a signal comes first, determining whether the distance to the station is greater than the distance to a second signal D2, which determines if there is a second signal before reaching the next station;
if there is a second signal before reaching the next station, calculating the following variables:
Minimum Travel Time, based on the transit vehicle maximum speed (sec), Estimated Travel Time, based on transit vehicle current speed, to the next signal (sec), and
Maximum Travel Time, based on a predetermined transit vehicle minimum speed (sec);
testing whether a time to green of the next downstream signal plus a clearance interval is less than is adequate;

if the testing result is NO, transit vehicle is estimated to arrive at red at current speed, then testing whether the estimated travel time to the next signal is greater than the time to green of the next signal plus the green interval for the next signal phase;

if NO, determine whether the Maximum Travel Time is less than the time to green of the next signal plus the green interval of the next signal; and if YES, transmit an advisory message to the transit vehicle, wherein the advisory message includes a recommendation to drive at the minimum drive speed.

7. The method of claim 1 including, in the computer system, executing the steps of:

reading the current speed, position, Signal Phasing and Timing, Green Intervals GIs, and Cycle Intervals CIs for a next downstream signal and for a second downstream signal along the route based on the stored route traffic management data;

in the computer system, calculating values of variables Distance to next signal, Distance to next Station, Time to Green of next signal, Distance to second signal, Distance to second Station, and Time to Green of second signal;

based at least in part on the calculated values of the variables: determining whether the transit vehicle is moving;

if the transit vehicle is moving, determining which comes next along the route, a signal or a station;

if a signal comes first, determining whether next signal or a station comes next after the signal;

if a station comes next after the signal:

calculating a minimum travel time based on a maximum speed of the transit vehicle and a Driver Perception Reaction Time (sec);

calculating an estimated travel time, based on the current speed;

calculating a Maximum Travel Time;

testing whether the transit vehicle will arrive at green state of the next signal at the current speed; and if the testing result is yes, transmitting a message to the transit vehicle recommending that it drive at the current speed.

* * * * *